Jan. 9, 1934.                F. C. CRAW                1,942,472
                   NONREVERSIBLE STEERING MECHANISM
                        Filed April 4, 1928          3 Sheets-Sheet 1

Inventor
Frank C. Craw
By Wooster & Davis
Attorneys

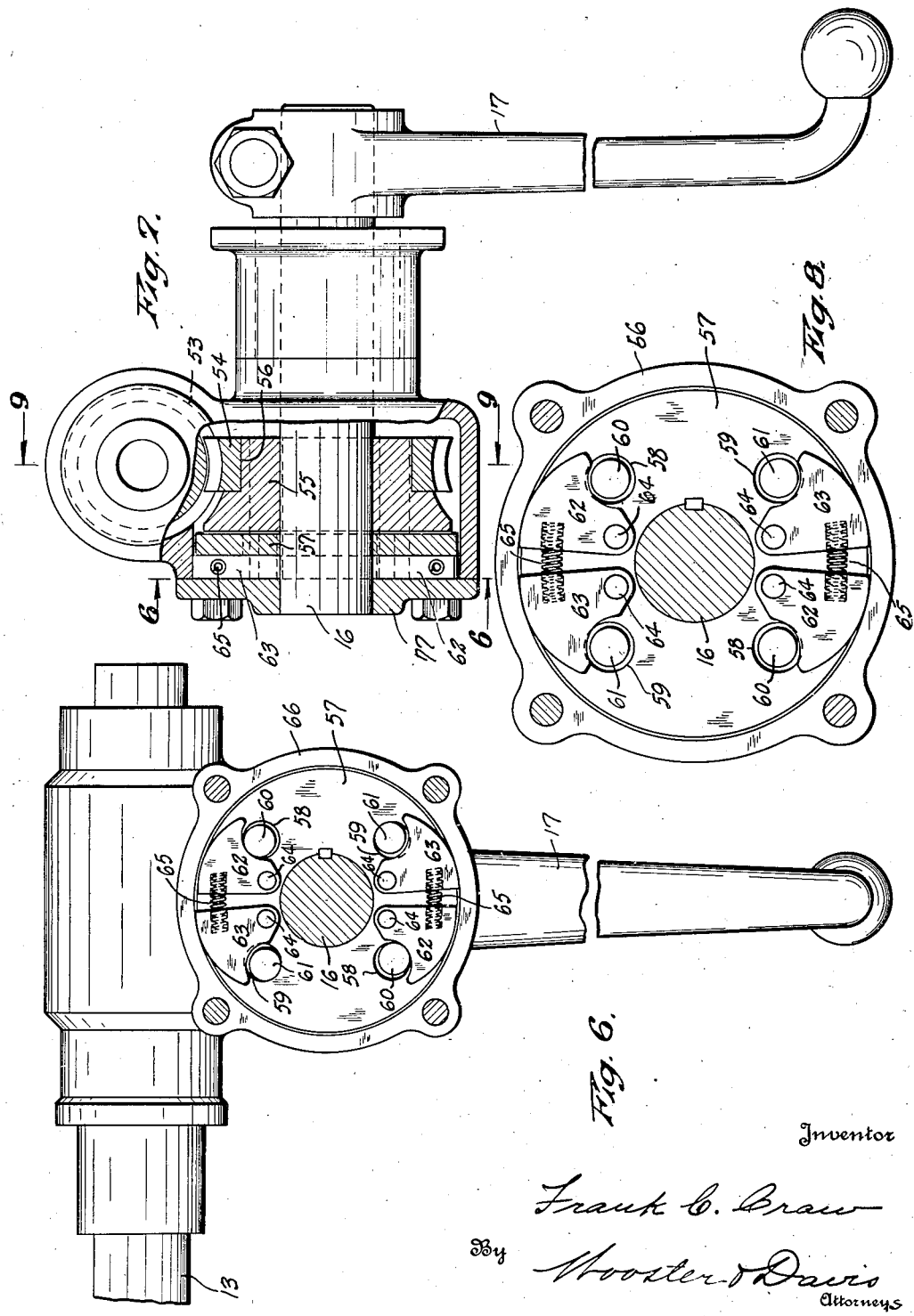

Jan. 9, 1934.  F. C. CRAW  1,942,472
NONREVERSIBLE STEERING MECHANISM
Filed April 4, 1928   3 Sheets-Sheet 3
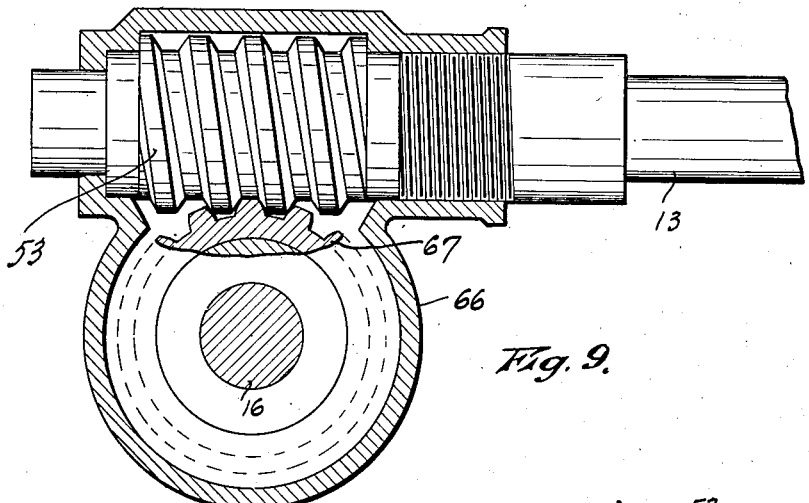
Fig. 9.
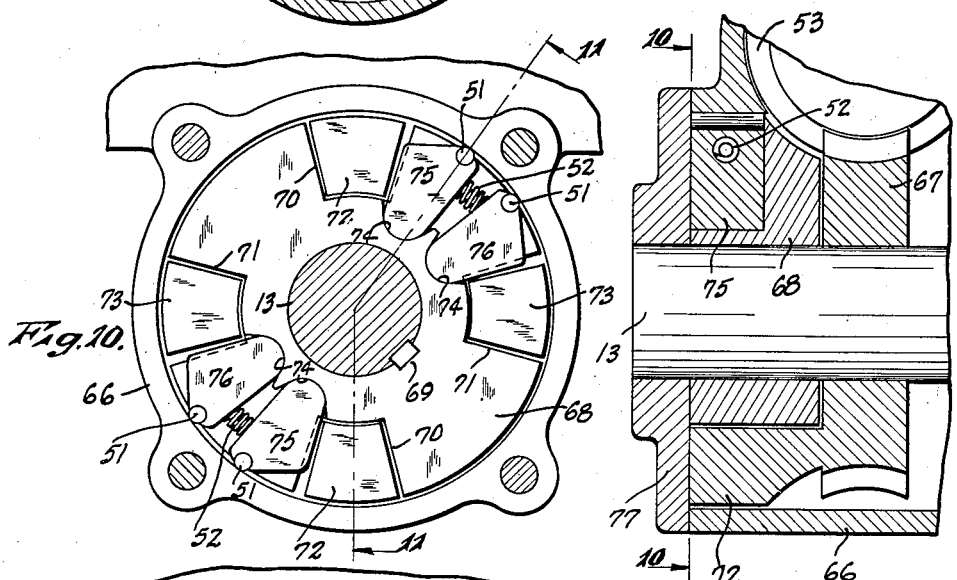
Fig. 10.
Fig. 11.
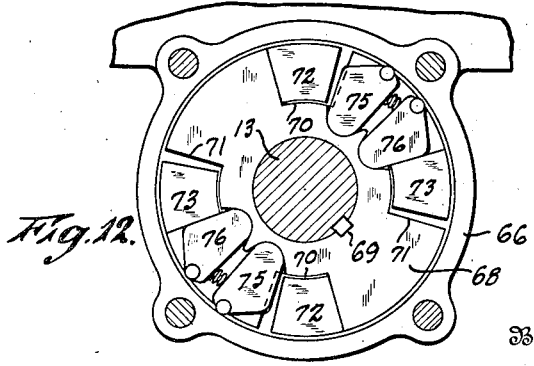
Fig. 12.
Inventor
Frank C. Craw
By Wooster & Davis
Attorneys Patented Jan. 9, 1934

1,942,472

UNITED STATES PATENT OFFICE 1,942,472

NONREVERSIBLE STEERING MECHANISM

Frank C. Craw, East Norwalk, Conn.

Application April 4, 1928. Serial No. 267,275

1 Claim. (Cl. 192—8)

This invention relates to steering mechanism for automobiles, and particularly to a non-reversing device or lock to prevent loss of control of the car should one of the front wheels hit an obstruction or depression in the road, or run into mud, sand or soft earth at the side of the road. With the steering mechanism now generally used for automobiles the ratio of the gears is such that they are reversible. That is, if a front wheel should strike a rock or obstruction or run into soft earth, or should a tire burst or blow out it would tend to be swung sideways and jerk the steering wheel from the hands of the driver with resultant loss of control, and this has caused a number of serious accidents.

It is, therefore, an object of my invention to provide a simple and effective device which will lock the front wheels in whatever position they may be placed by the hand steering wheel, and so can only be changed by operating this steering wheel, but which device will in no way interfere with the free and easy operation of the front wheels by the steering wheel.

It is also an object of the invention to provide a construction, which, should the locking mechanism fail, will not interfere with the steering operation, and this can, therefore, be effected in the usual manner.

With the above and other objects in view the invention consists in certain novel features of construction, combinations and arrangements of parts as will be more fully described and particularly pointed out in the appended claims. In the accompanying drawings, I have shown several different applications of the device embodying my invention. In these drawings, Fig. 1 is a partial side elevation and partial section through a steering mechanism, the section being substantially on line 1—1 of Fig. 2.

Fig. 6 is a partial side elevation and partial section substantially on line 6—6 of Fig. 7 showing the locking mechanism as applied in position in the steering mechanism, the locking mechanism being of the same type as that shown in Figs. 1 and 2, and showing one set of locking elements released.

Fig. 7 is a partial section and partial side elevation of the structure shown in Fig. 6.

Fig. 8 is a view of the locking mechanism of Fig. 6 showing both sets of locking elements in locking position to prevent movement of the front wheels in either direction except under action of the steering wheel.

Fig. 9 is a detail partially in section and partially in elevation of a portion of the steering mechanism, the section being substantially on line 9—9 of Fig. 7.

Figure 5:
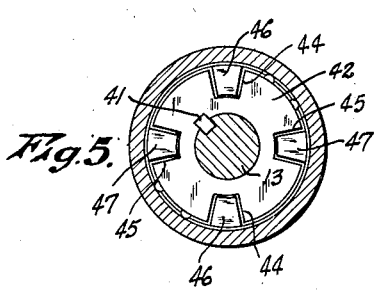
Fig. 5 is a transverse section substantially on line 5—5 of Fig. 3.
Figure 4:
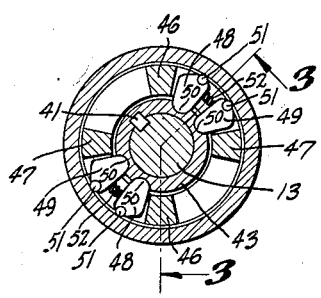
Fig. 4 is a transverse section substantially on line 4—4 of Fig. 3.

Fig. 10 is a transverse section substantially on line 10—10 of Fig. 11 showing the locking mechanism in elevation and which is of a somewhat different construction from that shown in Figs. 1, 2, 6, 7 and 8, but is somewhat on the order of the construction of Figs. 4, 5 and 6, but on a larger scale, and showing both sets of locking elements in locking position.

Fig. 11 is a detail section substantially on line 11—11 of Fig. 10, and

Fig. 12 is a view on the same plane as Fig. 10 showing one set of locking elements released.

Figure 2:
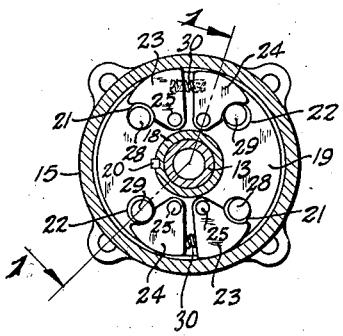
Fig. 2 is a transverse section substantially on line 2—2 of Fig. 1.
Figure 1:
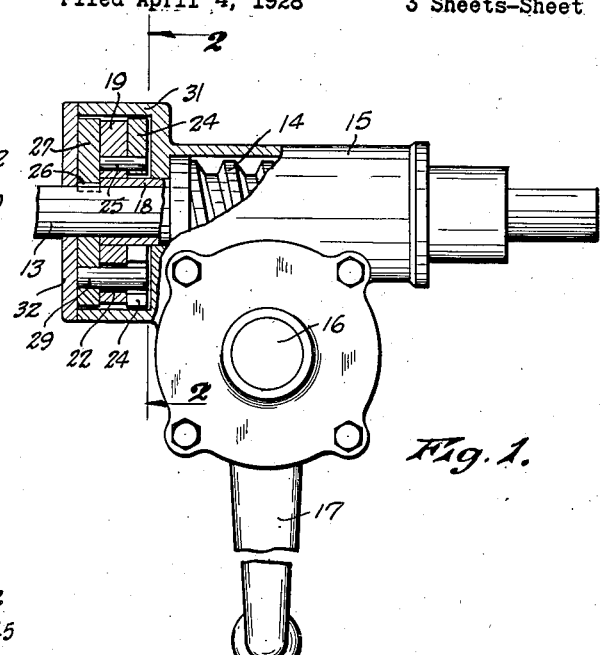

Referring to Figs. 1 and 2, I have shown a locking device as connected to the shaft operated by the steering wheel. In this construction the shaft 13 is the shaft extending through the usual steering column and to which the steering wheel, not shown, is connected for operating this shaft. In the ordinary simple steering mechanism the worm 14 is fastened to this shaft and meshes with a worm gear, not shown, in the casing 15 and mounted on the short shaft 16 to which is connected the ball crank 17 for operation of this crank, which operation through the usual steering rods, not shown, operates the steering knuckles carrying the front wheels. However, in the present construction the worm 14 is loose on the shaft 13 and is connected to a tubular shaft 18 on which is rigidly mounted a plate 19. This plate may be keyed to this extension as indicated at 20, or the plate may be shrunk onto this extension. This plate has a series of openings 21 and 22 therein, in the present construction there being two sets or pairs of these openings, and mounted adjacent each opening is a pivoted pawl 23 or 24 and these pawls are each pivoted on a pin 25 forced into the plate 19.

Mounted on the shaft 13 and secured thereto as by a key 26 is an operating plate 27 although this plate is ordinarily shrunk onto the shaft. Pressed into this plate so as to be rigidly secured thereto are pins or projections 28 and 29 and these pins project through the openings in the plate 19, the pins 28 passing through the openings 21 and the pins 29 through the openings 22. These pins are somewhat smaller in diameter than the diameter of the openings so as to permit a limited turning movement of the plate 27 relative to the plate 19. The locking pawls 23 and 24 are so located with respect to the openings 21 and 22 and the pins 28 and 29 that they may be engaged by these pins under certain conditions to be released by them. A spring 30 is mounted between two adjacent pawls 23 and 24 and tends to turn these pawls about their pivots 25 to locking engagement with the inner surface of the casing 31. The opposite ends of these springs are set into recesses in the pawls so that the springs will be held in position. It will be noted the casing 31 is open at one side but this open side is closed by a suitable cap 32 held by screws or bolts 33.

In operation the outer free or curved ends 23 and 24 are normally in engagement with the inner surface of the wall of the casing 31. If now the shaft 13 should be turned to the left or counterclockwise, as viewed in Fig. 2, by the steering wheel, the pins 28 and 29 will first move in the openings 21 and 22 toward the left side of these openings to engage the same. During this operation the pins 29 will engage the sides of the pawls 24 and will swing their free outer ends away from the wall of the casing 31, as indicated in Fig. 2, although the amount of movement is exaggerated in the drawing to more clearly show the operation. When the pins 28 and 29 engage the side walls of the opening 21 and 22 in the plate 19 further movement of the shaft 13 and plate 27 will, through the pins 28 and 29, shift the plate 19 and with it the worm 14 which will operate the crank 17 to shift the front wheels of the car. The pawls 23 during this movement would merely slide free on the inner surface of the casing 31 and will not interfere with the operation of the elements. If the plate 27 and shaft 13 are turned clockwise, as viewed in Fig. 2, the pins 28 and 29 will swing in the opposite direction against the opposite side walls of the openings 21 and 22 to swing the plate 19 in the opposite direction, and through the worm and crank will swing the front wheels in the opposite direction. During this movement the pawls 24 will slide freely on the inner wall of the casing while the pawls 23 will be released by the pins 21. It will thus be seen the locking pawls do not interfere in any way with the operation of the front wheels of the car for steering purposes from the hand steering wheel.

Should, however, one of the front wheels of the car hit an obstruction, a rut, or should run off the side of the road into mud, sand, or soft earth, and therefore, tend to swing laterally, it will tend to turn the crank 17 and through the gearing turn the shaft 13 and the steering wheel. It might jerk it from the hands of the driver causing him to lose control provided such movement were permitted. The locking mechanism shown, however, will prevent this result. As soon as the force tends to turn the worm 14 it will tend to turn the plate 19 which is rigidly attached to the worm, and if plate 19 should turn to the right, as viewed in Fig. 2, the free outer curved end of the pawls 23 will be immediately clamped against the inner wall of the casing 31 and will prevent any further movement. This is because the portion of this surface adjacent the right hand edge of the upper pawl 23 or the left hand edge of the lower pawl 23 is eccentric to the pivot pins 25, and so as the pawl tends to swing about this pivot its outer end will immediately clamp against the outer wall of the casing, and the greater the force tending to rotate the shaft the tighter the pawls will clamp against the casing. Should the action of the front wheel of the car tend to turn the plate 19 in the opposite direction or to the left, as viewed in Fig. 2, the other set of pawls 24 being reversed in arrangement from the pawls 23, will immediately clamp against the inner surface of the casing 31 and prevent movement in this direction. Thus the front wheels of the car are locked against movement by forces acting on the wheels themselves, and they are held in the position in which they are placed by operation of the hand steering wheel, but this locking means in no way interferes with the steering operation by the hand steering wheel.

Figure 3:
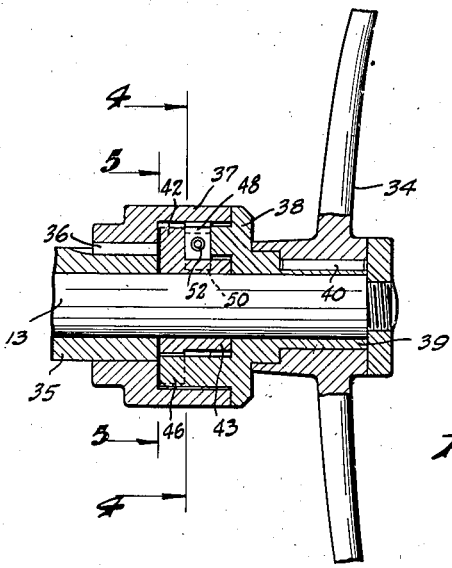
Fig. 3 is a longitudinal section through a device of a slightly different construction as applied to the steering column adjacent the steering wheel, the section being substantially on line 3—3 of Fig. 4.

Referring to Figs. 3, 4 and 5, I have shown the locking means applied to the steering column immediately under the hand steering wheel 34 of which only the hub and spokes are shown. The locking mechanism is also of a somewhat different construction from that shown in Figs. 1 and 2. The shaft 13 is enclosed by the steering column 35 which, of course, is rigidly mounted in the car. Rigidly secured to this column as by a key 36, or other suitable means is a casing 37 open at its upper end which is closed by a cap or plate 38. This plate corresponds to and has substantially the same function as the plate 27 in the form shown in Figs. 1 and 2 and is mounted loosely on the shaft 13. It has an extension 39 on which the hand steering wheel 34 is mounted and to which it is rigidly secured either by shrinking it onto this extension or by a key 40.

Within the casing 37 and rigidly secured to the shaft 13 as by means of a key 41, or by shrinking onto the shaft, is a plate 42 which has a hub 43 secured to the shaft 13. This plate has openings or notches 44 and 45 substantially diametrically oppositely spaced to receive extensions 46 and 47 respectively carried by the cap or plate 38. The openings or notches are somewhat wider than the extensions to permit limited relative turning movement between the plates 38 and 42. Also pivotally connected to the plate 42 are the pawls 48 and 49 arranged in two opposed pairs, and as will be seen from Fig. 4 the pawls 49 are reversed in position from the pawls 48. A convenient means of mounting these pawls is to provide curved recesses in the hub 43 in which the curved inner ends 50 of the pawls are seated and on which they may turn. In their outer or free ends the pawls may carry circular clamping rods or lugs 51. As in the first form springs 52 are mounted between each set of pawls 48 and 49 tending to separate their free ends by swinging them about their pivotal mountings.

The operation of this construction is substantially the same as that shown in Figs. 1 and 2. If the hand steering wheel is turned to the left as viewed from the driver's position, or clockwise, as viewed in Figs. 4 and 5, it will turn the cap or plate 38 which will carry with it the extensions 46 and 47. These extensions will move until they engage the side walls of the notches 44 and 45 and then further movement of the extensions will carry with them the plate 42 which will turn the shaft 13 as this plate is rigidly connected to the shaft. Before the extensions 46, however, engage the sides of their recesses 44 they will engage the pawls 48 and will swing the free ends of these pawls away from the surface of the casing 39 and will thus unlock them so that they will not interfere with the movement of the plate 42. The lugs 49 will not interfere with this movement because they will merely slide along the inner wall of the casing. If the steering wheel is turned in the opposite direction, or counterclockwise as viewed in Figs. 4 and 5, the lugs 47 will release the pawls 49 in the same manner while the lugs 48 will slide along the inner wall of the casing, the plate 42 being rotated in the opposite direction or to the left by engagement of the extensions 46 and 47 with the opposite sides of the recesses 44 and 45.

Should, however, the shaft 13 tend to turn under action of the front wheels of the car clockwise or to the right, as viewed in Fig. 4, pawls 48 will immediately clamp against the casing 37 and lock the shaft from further movement and prevent this turning movement being transmitted to the hand steering wheel. If the shaft 13 tends to turn to the left or counterclockwise, as viewed in Fig. 4, it will immediately be locked by the pawls 49. This is because the clamping lugs or rods 51 are arranged so that they will swing outwardly about the pivots of the pawls.

Referring to Figs. 6, 7 and 8, I have shown a locking mechanism substantially the same as that shown in Figs. 1 and 2 but as applied to the short shaft 16 instead of the steering wheel shaft 13. In this arrangement the worm 53 is rigid on the shaft 13 and meshes with a worm wheel 54 rigid on an element 55 which is loose on the shaft 16. This worm wheel may be forced onto a hub or reduced portion 56 on this element. Keyed to the shaft 16 or otherwise rigidly secured thereto as by forcing it on the shaft is the plate 57 provided with two sets of openings 58 and 59 therein which correspond to the openings 21 and 22 in the form shown in Figs. 1 and 2, the plate 57 corresponding to the plate 19 in the first form while the member 55 corresponds to the plate 27 in the first form.

Pressed into the member 55 are pins 60 and 61 extending into the openings 58 and 59 respectively and of somewhat smaller diameter than these openings to permit a slight turning movement between the member 55 and the plate 57. Mounted on the plate 57 are two sets of pawls 62 and 63 pivoted on the pivot pins 64 pressed into the plate 57, and between each set of pawls 62 and 63 is a spring 65 tending to separate their free ends. These pawls correspond to the pawls 23 and 24 of the first form and are operated by the pins 60 and 61 exactly the same as are the pawls 23 and 24 operated by the pins 28 and 29 of the first form so that steering through this device is the same as that of the first form. If the shaft 16 is turned from the front wheels of the car these pawls 62 and 63 lock against the inner surface of the casing 66 the same as described in connection with the other forms. This operation is clearly shown in Fig. 8 where if the shaft 16 tends to turn the plate 57 to the right the pawl 63 will immediately lock against the casing 66, and if the shaft 16 tends to turn the plate 57 to the left pawls 62 will immediately lock against the casing.

Referring to Figs. 10, 11 and 12, the form of device shown in these figures is substantially the same as that shown in Figs. 3, 4 and 5, but it is designed for arrangement on the shaft 13 operated by the worm 53 and on which the crank 17 is mounted. In this arrangement the worm gear 67 is loose on the shaft 13 and a driven member or plate 68 is rigid on the shaft 13 to which it may be secured by a key 69, or as is the usual practice is shrunk onto this shaft. This plate 68 corresponds to plate 42 of Figs. 3, 4 and 5 and has openings or notches 70 and 71 therein. The worm gear 67 has laterally extending lugs 72 and 73 projecting into openings or notches 70 and 71 respectively, and these lugs are of a somewhat less width than the openings in order to permit limited turning movement between the gear 67 and the plate 68. Plate 68 has curved recesses 74 in which are pivoted pawls 75 and 76 by means of curved ends seated in these recesses. These opposite or free ends are located adjacent the inner wall of casing 66 which is the same as the casing 66 in Figs. 6, 7 and 8. It will be noted that this casing is open at one side to permit insertion or removal of the elements and is closed by the cap or plate 77. The pawls 75 and 76 may have their outer ends curved to clamp against the casing similar to the pawls shown in Figs. 2, 6 and 8 or they may have the curved holding or clamping portions 51 the same as the pawls shown in Fig. 4. They are also held against the surface of the casing by the springs 52 the same as in the other forms. This form of device operates the same as the form shown in Figs. 3, 4 and 5 except for the difference in location. That is, the lugs 72 and 73 unlock the locking pawls 75 and 76 respectively when the worm gear 67 is operated from the hand steering wheel and the lugs then drive the plate 68 to operate the shaft 13 and steer the front wheels of the car. If the tendency to turn the shaft 13 comes from the front wheels of the car the pawls 75 and 76, depending in which direction the shaft 10 is to turn, immediately lock against the inner surface of the casing and prevent the front wheels swinging out of position.

It will be apparent from the foregoing description that the device may be made of simple and rugged construction, and therefore, will be effective and reliable in operation and not easily gotten out of order. It is not a complicated construction and requires comparatively small space on the steering mechanism. It effectively locks the front wheels in whatever position the hand steering wheel places them, and they can only be changed by this steering wheel. Also this device does not interfere with the steering in the usual manner as the steering device turns as freely and easily in either direction as it would without this attachment, and the hands can be removed from the steering wheel without danger of the front wheels of the car changing position. Further, neither the front wheels of the car nor the steering wheel will shimmy or vibrate. Consequently, it is an extremely safe and easily operated steering device. It is to be noted that the drive from the steering wheel is direct and not through the locking pawls, and therefore, in case of excessive wear or any damage to this attachment the whole steering assembly, as far as the operation of the front wheels of the car from the steering wheel is concerned, will operate the same as before and the car can thus be operated the same as if this device had not been attached. If while running a tire should blow out the front wheels would remain in set positions and the operator would feel no jerk on the steering wheel. The same would be true if a front wheel struck an obstruction or depression in the road or if they ran off the side of the road into mud, sand or soft earth.

In running over rough roads or ruts neither the front wheels nor the steering wheels will wobble or be affected in any way. Therefore, in view of all this there is much less danger of the operator losing control of the car. With this device there is much less wear on the worm and worm gear due to there being no vibration of the ball arm or crank, and the operator is not required to continually grip the steering wheel while driving and he can, therefore, drive much longer and further without fatigue.

Having thus set forth the nature of my invention, what I claim is:

In a device of the character described, a shaft, a plate secured to the shaft having two pairs of spaced openings therein and also having diametrically opposite pairs of curved recesses opening outwardly with each pair of recesses between a pair of openings, a driving member free on the shaft and having two pairs of rigid extensions projecting into said openings and of less width than the openings so as to have limited movement therein but provide a positive driving connection between the driving member and the plate, a stationary casing, two pairs of pawls having rounded ends seated in said recesses and located with a pair of pawls between each pair of extensions, the pawls of each pair adapted to move away from each other to engage the casing to prevent turning of the plate, resilient means between each pair of pawls tending to move them to holding position, and said rigid extensions adapted to engage the pawls on their outer sides to move them to inoperative position on initial turning movements of the driving member.

FRANK C. CRAW.